(12) United States Patent
Morimoto (10) Patent No.: US 12,345,351 B2
(45) Date of Patent: Jul. 1, 2025

(54) VALVE DEVICE

(71) Applicant: MITSUBISHI HEAVY INDUSTRIES COMPRESSOR CORPORATION, Tokyo (JP)

(72) Inventor: Makio Morimoto, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 154 days.

(21) Appl. No.: 18/464,571

(22) Filed: Sep. 11, 2023

(65) Prior Publication Data

US 2024/0110637 A1    Apr. 4, 2024

(30) Foreign Application Priority Data

Sep. 29, 2022    (JP) ................................. 2022-156542

(51) Int. Cl.
     *F16K 31/122*      (2006.01)
     *F16K 1/32*      (2006.01)
     (Continued)

(52) U.S. Cl.
     CPC ............... *F16K 31/50* (2013.01); *F16K 1/32* (2013.01); *F16K 1/385* (2013.01);
     (Continued)

(58) Field of Classification Search
     CPC . F16K 31/50; F16K 1/32; F16K 31/53; F16K 31/60; F16K 1/385; F16K 31/508; F16K 31/1221
     See application file for complete search history.

(56) References Cited

U.S. PATENT DOCUMENTS

2020/0240284 A1    7/2020    Nishitani et al.
2020/0256207 A1    8/2020    Nimchan et al.

FOREIGN PATENT DOCUMENTS

JP    2001329803 A    * 11/2001
JP    5631166 B2    * 11/2014
(Continued)

*Primary Examiner* — Marina A Tietjen
(74) *Attorney, Agent, or Firm* — Osha Bergman Watanabe & Burton LLP (57) ABSTRACT

A valve device includes a valve rod connecting a valve main body and a piston and capable of advancing and retracting in a first direction integrally with the valve main body and the piston, a rotary sleeve rotatably supported on a valve casing in a first circumferential direction around a first center axis, an operation member configured to rotate an operation shaft in a second circumferential direction, an advancing and retracting sleeve immovably fixed to the valve rod and the piston, and a stopper member configured to restrict an amount of movement of the advancing and retracting sleeve toward a first side in the first direction. The operation shaft is connected to the rotary sleeve such that a rotation of the operation shaft in the second circumferential direction can be converted into a rotation in the first circumferential direction and transmitted to the rotary sleeve. The advancing and retracting sleeve is movable in the first direction when the rotary sleeve rotates in the first circumferential direction. The stopper member is capable of coming into contact with the advancing and retracting sleeve when the advancing and retracting sleeve moves toward the first side in the first direction by a specified value.

6 Claims, 6 Drawing Sheets

(51) Int. Cl.
*F16K 1/38* (2006.01)
*F16K 31/50* (2006.01)
*F16K 31/53* (2006.01)
*F16K 31/60* (2006.01)

(52) U.S. Cl.
CPC ........ *F16K 31/1221* (2013.01); *F16K 31/508* (2013.01); *F16K 31/53* (2013.01); *F16K 31/60* (2013.01)

(56) References Cited

FOREIGN PATENT DOCUMENTS

JP 2019100243 A * 6/2019
JP 6743049 B2 8/2020

* cited by examiner

VALVE DEVICE

CROSS-REFERENCE TO RELATED APPLICATIONS

This application claims the benefit of priority to Japanese Patent Application Number 2022-156542 filed on Sep. 29, 2022. The entire contents of the above-identified application are hereby incorporated by reference.

TECHNICAL FIELD

The disclosure relates to a valve device.

RELATED ART

A flow path for supplying steam to a steam turbine is provided with a steam valve such as a main stop valve. As disclosed in, for example, US 2020/0,256,207, such a steam valve opens and closes a flow path of steam, regulates a flow rate of steam supplied to a steam turbine, shuts off the steam, and the like. The steam valve includes a valve main body that opens and closes a flow path, a valve rod connected to the valve main body, and a valve drive mechanism that advances and retracts the valve rod in an axial direction of the valve rod.

SUMMARY

As for the steam valve described in US 2020/0,256,207, it is conceivable to manually open and close the valve main body in an emergency by advancing and retracting the valve rod in the axial direction of the valve rod by using a handle or the like provided outside the steam valve. In such a case, an advancing and retracting member that is sometimes used advances and retracts the valve rod by rotating around the axis of the valve rod due to the rotation of the handle to be transmitted.

A valve device such as the above-described steam valve causes, in a fully-opened state or a fully-closed state, the advancing and retracting member to touch a valve casing or a stopper formed at a part of the valve casing. At this time, the advancing and retracting member that advances and retracts in the axial direction of the valve rod while rotating around the axis comes into contact with the stopper. If such a contact state is maintained for a long time, the advancing and retracting member may adhere to the stopper. As a result, when, in an emergency, the degree of opening is changed from the degree of opening maintained for a long time, the advancing and retracting member cannot move, making it difficult to change the degree of opening in the middle.

The disclosure has been made to solve the above-described problem, and an object of the disclosure is to provide a valve device capable of stably changing the degree of opening from the degree of opening maintained for a long time.

To solve the above-described problem, a valve device according to an embodiment of the disclosure includes: a valve casing internally including a flow path through which a fluid flows; a valve main body capable of advancing and retracting in a first direction in the valve casing and capable of opening and closing the flow path; a piston disposed in the valve casing and driven by oil pressure to advance and retract in the first direction; a valve rod extending in the first direction around a first center axis, connecting the valve main body and the piston, and capable of advancing and retracting in the first direction integrally with the valve main body and the piston; a rotary sleeve disposed on an outer side of the valve rod in a radial direction around the first center axis, formed in a tubular shape covering the valve rod and rotatably supported on the valve casing in a first circumferential direction around the first center axis; an operation shaft disposed on an outer side of the rotary sleeve in the radial direction and extending in a second direction intersecting the first direction around a second center axis; an operation member fixed to a base end portion of the operation shaft in the second direction outside the valve casing and configured to rotate the operation shaft in a second circumferential direction around the second center axis; an advancing and retracting sleeve formed in a tubular shape around the first center axis while covering the valve rod from an outer side in the radial direction on an inner side of the rotary sleeve in the radial direction and immovably fixed to the valve rod and the piston; and a stopper member fixed to the valve casing at a position close to the valve main body in the first direction with respect to the advancing and retracting sleeve and configured to restrict an amount of movement of the advancing and retracting sleeve toward a first side in the first direction to a specified value predetermined. The operation shaft is connected to the rotary sleeve such that a rotation of the operation shaft in the second circumferential direction can be converted into a rotation in the first circumferential direction and transmitted to the rotary sleeve. The advancing and retracting sleeve is movable in the first direction when the rotary sleeve rotates in the first circumferential direction. The stopper member is capable of coming into contact with the advancing and retracting sleeve when the advancing and retracting sleeve moves toward the first side in the first direction by the specified value.

According to the valve device of the disclosure, the degree of opening can be stably changed from the degree of opening maintained for a long time.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments for implementing a valve device according to the disclosure will be described with reference to the accompanying drawings. However, the disclosure is not limited only to these embodiments.

Configuration of Steam Turbine

Figure 1:
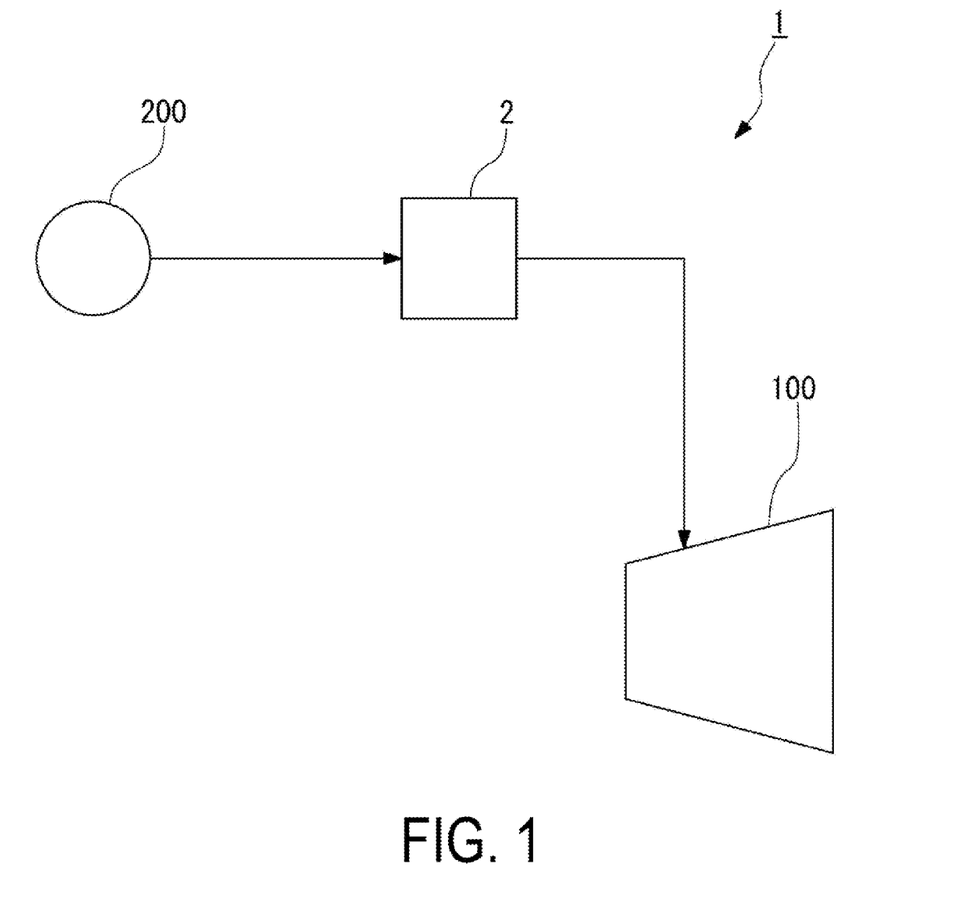
FIG. 1 is a diagram illustrating a schematic configuration of a steam turbine equipped with a valve device according to an embodiment of the disclosure.

As illustrated in FIG. 1, a steam turbine 1 includes a turbine main body 100 and a valve device 2.

The turbine main body 100 is supplied with steam (fluid) from a steam supply source 200 such as a boiler. In the turbine main body 100, a rotor (not illustrated) rotatably disposed in a casing (not illustrated) is rotationally driven by the supplied steam. The rotation of the rotor (not illustrated) is transmitted to, for example, a generator via an output shaft to generate electric power.

The valve device 2 is connected to an inlet (not illustrate) of the turbine main body 100. The valve device 2 can regulate the amount of steam supplied to the turbine main body 100. The valve device 2 of the present embodiment is a trip and throttle valve (TTV). The valve device 2 can urgently shut off the supply of steam to the turbine main body 100. In the present embodiment, a state where the valve device 2 keeps supplying steam to operate the turbine main body 100 in a steady state (fully-opened state) is defined as normal operation. On the other hand, in a case where an abnormality occurs in a rotating body or a plant device and thus an emergency stop of the turbine main body 100 and a plant is required, a state where the valve device 2 shuts off the supply of steam to urgently stop the turbine main body 100 (fully-closed state) is defined as emergency stop.

Figure 2:
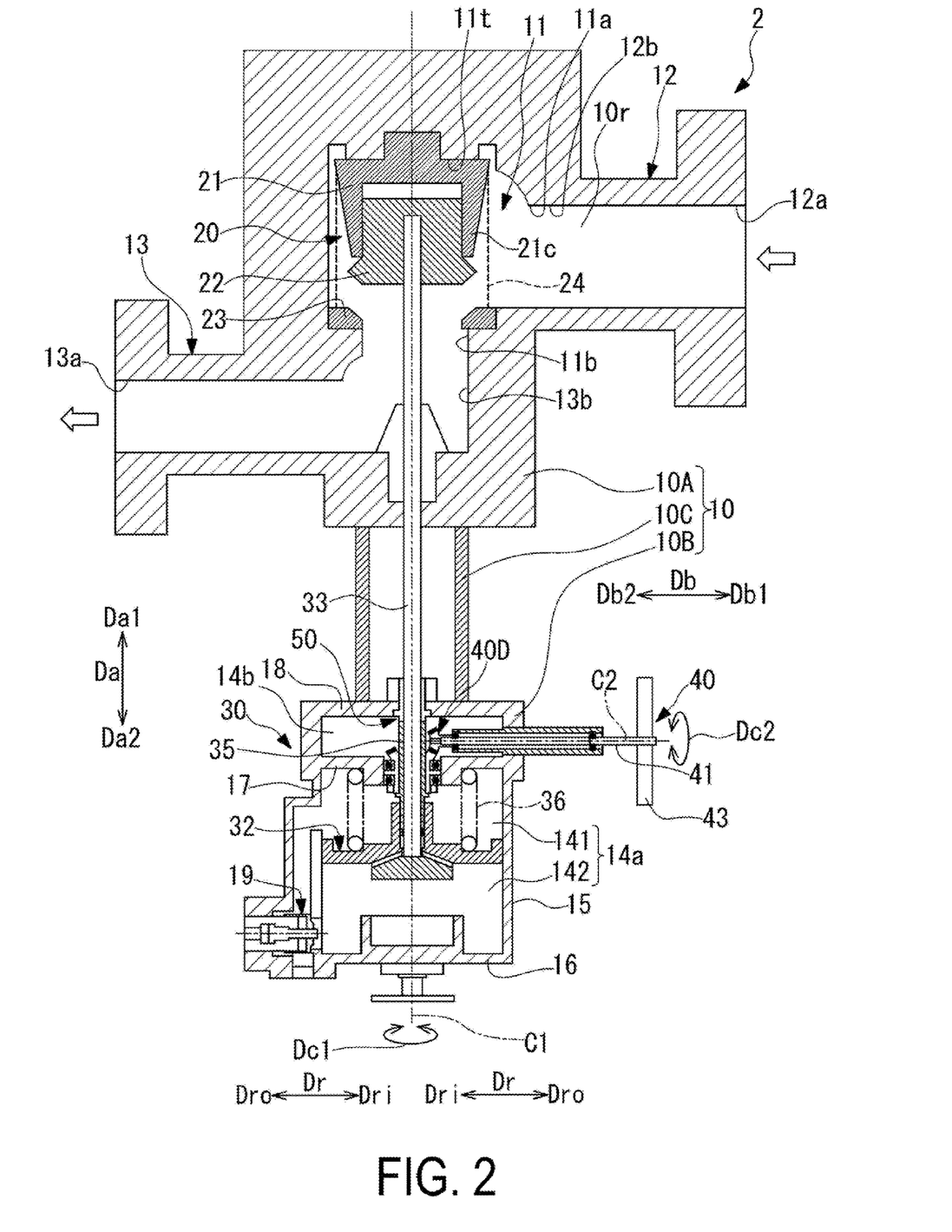
FIG. 2 is a cross-sectional view of the valve device.

As illustrated in FIG. 2, the valve device 2 includes a valve casing 10, a valve portion 20, and a valve drive unit 30. In the following description, a direction in which the valve main body 22 described later advances and retracts in the valve casing 10 is referred to as a first direction Da, and a direction intersecting (in the present embodiment, orthogonal to) the first direction Da is referred to as a second direction Db. In the present embodiment, the first direction Da is the vertical direction. In the valve device 2, a side on which the valve portion 20 is disposed with respect to the valve drive unit 30 is referred to as a first side Da1 in the first direction Da. In the first direction Da, a side which is opposite to the first side Da1 and on which the valve drive unit 30 is disposed with respect to the valve portion 20 is referred to as a second side Da2 in the first direction Da. That is, in the present embodiment, the first side Da1 in the first direction Da is an upper side in the vertical direction, and the second side Da2 in the first direction Da is a lower side in the vertical direction.

Note that the second direction Db is not limited to a direction orthogonal to the first direction Da as in the present embodiment. The second direction Db may be a direction obliquely intersecting the first direction Da.

The valve casing 10 constitutes an exterior casing of the valve device 2. A flow path 10r through which steam (fluid) can flow is formed inside the valve casing 10. The valve casing 10 of the present embodiment includes a first casing portion 10A, a second casing portion 10B, and a third casing portion 10C.

The first casing portion 10A constitutes a region on the first side Da1 in the first direction Da in the valve casing 10. The first casing portion 10A accommodates the valve unit 20. The first casing portion 10A includes a valve chamber 11, an inlet flow path portion 12, and an outlet flow path portion 13. In the present embodiment, the flow path 10r is formed inside the first casing portion 10A.

The valve chamber 11 accommodates the valve portion 20 described later. The valve chamber 11 includes an inlet-side opening 11a that opens toward a first side Db1 in the second direction Db, and an outlet-side opening 11b that opens toward the second side Da2 in the first direction Da. That is, the inlet-side opening 11a and the outlet-side opening 11b open orthogonal to each other. In the valve chamber 11, steam flows from the inlet-side opening 11a toward the outlet-side opening 11b.

The first side Db1 in the second direction Db is a side on which an operation member 43 is disposed with respect to an operation shaft 41 described later. The second side Db2 in the second direction Db is a side on which the operation shaft 41 is disposed with respect to the operation member 43.

The inlet flow path portion 12 forms an opening into which steam flowing from the upstream side with respect to the valve device 2 flows. The inlet flow path portion 12 is formed in a tubular shape extending in the second direction Db. The inlet flow path portion 12 extends toward the first side Db1 in the second direction Db with respect to the valve chamber 11. One end 12a of the inlet flow path portion 12 is connected to a line such as a pipe connected to the steam supply source 200. The other end 12b of the inlet flow path portion 12 communicates with the inlet-side opening 11a.

The outlet flow path portion 13 forms an opening from which steam is discharged to the downstream side with respect to the valve device 2. The outlet flow path portion 13 is formed in a tubular shape extending in the second direction Db. The outlet flow path portion 13 extends to the second side Db2 in the second direction Db toward a side opposite to the inlet flow path portion 12 with respect to the valve chamber 11. One end 13a of the outlet flow path portion 13 is connected to a line such as a pipe connected to the inlet of the turbine main body 100. The other end 13b of the outlet flow path portion 13 communicates with the outlet-side opening 11b. In this manner, the flow path 10r through which steam flows from the inlet flow path portion 12 to the outlet flow path portion 13 via the valve chamber 11 is formed inside the first casing portion 10A.

Figure 3:
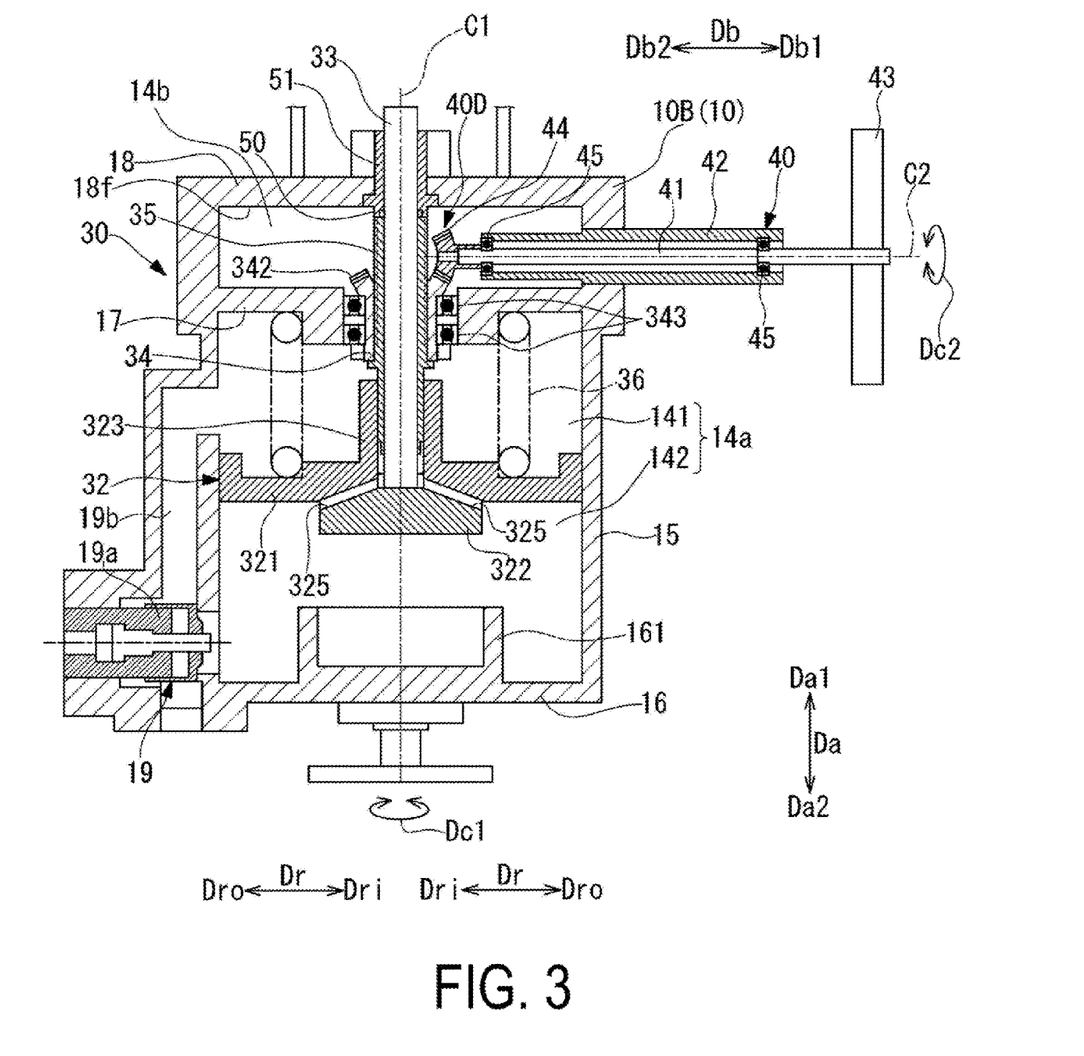
FIG. 3 is a cross-sectional view illustrating the configuration of a valve drive unit of the valve device.

The second casing portion 10B constitutes a region on the second side Da2 in the first direction Da in the valve casing 10. The second casing portion 10B covers a part of the valve drive unit 30. The second casing portion 10B is disposed at a position separated from the first casing portion 10A to the second side Da2 in the first direction Da. As illustrated in FIGS. 2 and 3, the second casing portion 10B includes a tubular wall portion 15, a first wall portion 16, a second wall portion 17, a third wall portion 18, and an oil supply and drainage portion 19.

The tubular wall portion 15 is formed in a tubular shape around a first center axis C1 extending in the first direction Da. Each of the first wall portion 16, the second wall portion 17, and the third wall portion 18 is formed in a plate shape along a surface intersecting the first center axis C1. The first wall portion 16 closes an end portion of the tubular wall portion 15 on the second side Da2 in the first direction Da.

Figure 4:
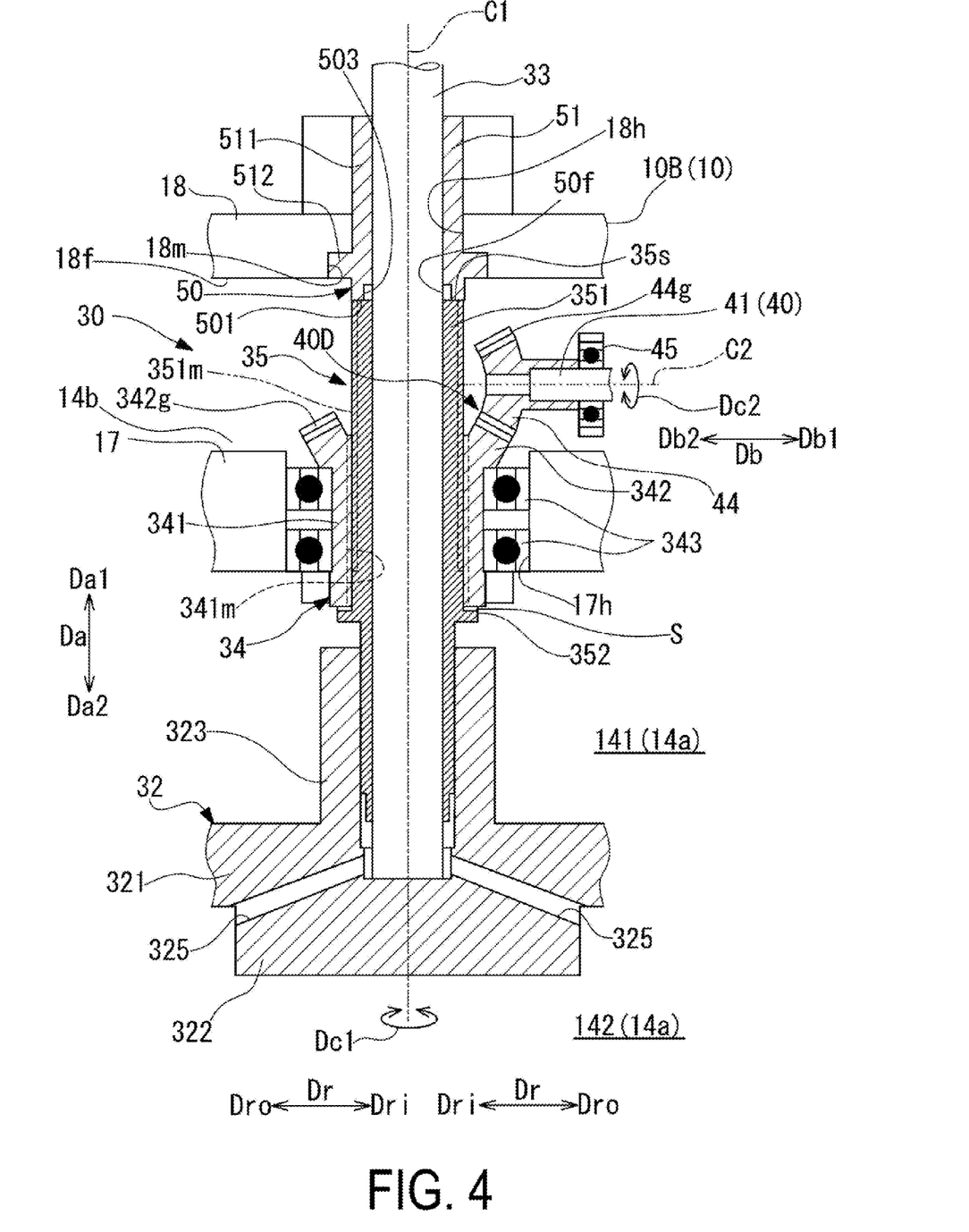
FIG. 4 is an enlarged cross-sectional view of a main part of the valve drive unit.

The third wall portion 18 closes an end portion of the tubular wall portion 15 on the first side Da1 in the first direction Da. As illustrated in FIG. 4, a through-hole 18h penetrating through the third wall portion 18 in the first direction Da is formed in a central portion of the third wall portion 18. A guide sleeve 51 is fixed to the inside surface of the through-hole 18h. The guide sleeve 51 guides a valve rod 33 described later to linearly move in the first direction Da.

The guide sleeve 51 integrally includes a guide portion 511 and a flange portion 512. The guide portion 511 is formed in a tubular shape around the first center axis C1. The guide portion 511 is inserted into the through-hole 18h formed in the third wall portion 18. The flange portion 512 protrudes from an end portion of the guide portion 511 on the second side Da2 in the first direction Da toward an outer side Dro in a radial direction Dr. The flange portion 512 is formed in an annular shape extending in a first circumferential direction Dc1 when viewed from the first direction Da. The flange portion 512 is fitted into an accommodating groove 18m formed in a surface 18f of the third wall portion 18 facing the second side Da2 in the first direction Da. A gap between the through-hole 18h and the valve rod 33 is sealed by disposing an oil seal (not illustrated) or the like on the first side Da1 in the first direction Da with respect to the guide sleeve 51.

As illustrated in FIG. 3, the second wall portion 17 is disposed between the first wall portion 16 and the third wall portion 18 in the first direction Da. A through-hole 17h (see FIG. 4) penetrating through the second wall portion 17 in the first direction Da is formed in a central portion of the second wall portion 17. The through-hole 17h is formed at a position overlapping with the through-hole 18h in the radial direction Dr. A pair of bearings 343 (see FIG. 4) is fixed to the inside surface of the through-hole 17h.

The second casing portion 10B forms a space therein by the tubular wall portion 15, the first wall portion 16, and the third wall portion 18. Further, the space in the second casing portion 10B is partitioned into a piston chamber 14a and a gear chamber 14b by the second wall portion 17.

The piston chamber 14a is a space surrounded by the tubular wall portion 15, the first wall portion 16, and the second wall portion 17. A piston 32 described later is accommodated in the piston chamber 14a movably in the first direction Da. Oil described later is stored in the piston chamber 14a. The interior of the piston chamber 14a is partitioned by the piston 32 into a first piston chamber 141 on the first side Da1 in the first direction Da and a second piston chamber 142 on the second side Da2 in the first direction Da.

The gear chamber 14b is a space surrounded by the tubular wall portion 15, the second wall portion 17, and the third wall portion 18. A driven gear 342 and a drive gear 44 described later are accommodated in the gear chamber 14b.

The oil supply and drainage portion 19 communicates with the piston chamber 14a. The oil supply and drainage portion 19 includes an emergency trip cylinder 19a and a drain flow path 19b. In the piston chamber 14a filled with the oil, the drain flow path 19b is normally closed by the emergency trip cylinder 19a. The emergency trip cylinder 19a causes the first piston chamber 141 and the second piston chamber 142 to communicate with the drain flow path 19b in an emergency. Accordingly, the oil in the piston chamber 14a is drained through the drain flow path 19b to the outside.

As illustrated in FIG. 2, the third casing portion 10C is disposed between the first casing portion 10A and the second casing portion 10B in the first direction Da. The third casing portion 10C is formed in a tubular shape extending in the first direction Da around the first center axis C1. The third casing portion 10C is fixed immovably with respect to the first casing portion 10A and the second casing portion 10B. The third casing portion 10C is formed between the first casing portion 10A and the second casing portion 10B while covering a part of the valve rod 33 described later.

The valve portion 20 can regulate a flow state of steam from the inlet-side opening 11a to the outlet-side opening 11b in the valve chamber 11. The valve portion 20 of the present embodiment includes a valve support 21, a valve main body 22, a valve seat portion 23, and a strainer 24.

The valve support 21 guides the movement of the valve main body 22 in the first direction Da. The valve support 21 is fixed to an inner surface 11t facing the first side Da1 in the first direction Da of the valve chamber 11. The valve support 21 includes a tubular portion 21c extending in a tubular shape in the first direction Da about the first center axis C1. The tubular portion 21c extends toward the second side Da2 in the first direction Da while protruding from the inner surface 11t.

The valve main body 22 can advance and retract in the first direction Da in the first casing portion 10A. The valve main body 22 can open and close the flow path 10r. The valve main body 22 of the present embodiment extends in a cylindrical shape in the first direction Da about the first center axis C1. The valve main body 22 is disposed inside the tubular portion 21c. The valve main body 22 is disposed such that the outside surface of the valve main body 22 is in sliding contact with the inside surface of the tubular portion 21c. The valve main body 22 can advance and retract in the first direction Da in the tubular portion 21c. Accordingly, the valve main body 22 is movable to protrude from the interior of the tubular portion 21c.

The valve seat portion 23 can close the outlet-side opening 11b by coming into contact with the valve main body 22. The valve seat portion 23 is an annular member around the first center axis C1. The valve seat portion 23 is disposed along a peripheral edge of the outlet-side opening 11b of the valve chamber 11. In a state where the valve main body 22 is separated from the valve seat portion 23 toward the first side Da1 in the first direction Da, the inlet flow path portion 12 and the outlet flow path portion 13 communicate with each other through between the valve main body 22 and the valve seat portion 23. The valve main body 22 in contact with the valve seat portion 23 closes the outlet-side opening 11b. Accordingly, the flow of steam in the valve chamber 11 between the inlet flow path portion 12 and the outlet flow path portion 13 is shut off.

The strainer 24 is disposed in the valve chamber 11. The strainer 24 captures foreign matter contained in the steam flowing from the inlet flow path portion 12 to suppress the inflow of the foreign matter into the outlet flow path portion 13 side. The strainer 24 captures foreign matter mixed in with the steam and causes only the steam to pass through. The strainer 24 is, for example, a mesh-like net member made of metal. For example, the strainer 24 is fixed to an outer peripheral portion of the valve support 21 and is disposed closing the inlet-side opening 11a.

The valve drive unit 30 can drive the valve main body 22 to advance and retract in the first direction Da with respect to the valve seat portion 23 in the valve chamber 11. The valve drive unit 30 is disposed at the second casing portion 10B and the third casing portion 10C. As illustrated in FIGS. 3 and 4, the valve drive unit 30 of the present embodiment includes the piston 32, the valve rod 33, a rotary sleeve 34, an advancing and retracting sleeve 35, a coil spring 36, a manual operation unit 40, and a stopper member 50.

The piston 32 is disposed in the piston chamber 14a. The piston 32 can advance and retract in the first direction Da in a reciprocating manner by oil pressure in the piston chamber 14a. The piston 32 of the present embodiment integrally includes a piston main body 321, a boss portion 322, and a first tubular portion 323.

The piston main body 321 is formed coming in sliding contact with the inside surface of the tubular wall portion 15. The piston main body 321 is formed in a disc shape around the first center axis C1. The piston main body 321 partitions the interior of the piston chamber 14a into the first piston chamber 141 and the second piston chamber 142. The boss portion 322 protrudes from a central portion of the piston main body 321 toward the second side Da2 in the first direction Da. The boss portion 322 is disposed in the second piston chamber 142. When the piston 32 moves toward the second side Da2 in the first direction Da in the piston chamber 14a, the boss portion 322 is accommodated in a boss accommodating portion 161 formed in the first wall portion 16. The boss accommodating portion 161 is formed in a tubular shape around the first center axis C1. The boss accommodating portion 161 protrudes in a tubular shape from the first wall portion 16 toward the first side Da1 in the first direction Da. The first tubular portion 323 protrudes from a central portion of the piston main body 321 toward the first side Da1 in the first direction Da. The first tubular portion 323 is formed in a tubular shape around the first center axis C1. The first tubular portion 323 is formed to have a diameter smaller than diameters of the piston main body 321 and the boss portion 322. The first tubular portion 323 is disposed in the first piston chamber 141.

The piston 32 includes a communication hole 325 that allows the first piston chamber 141 and the second piston chamber 142 to communicate with each other in the first direction Da with respect to the piston main body 321. The communication hole 325 is formed penetrating through the piston main body 321 and the boss portion 322. The communication hole 325 allows the inside surface of the first tubular portion 323 and the outside surface of the boss portion 322 to communicate with each other. A part of the oil in the second piston chamber 142 flows into the interior of the first tubular portion 323 through the communication hole 325. Then, a part of the oil that has flowed into the interior of the first tubular portion 323 flows into the first piston chamber 141.

As illustrated in FIG. 2, the valve rod 33 connects the valve main body 22 and the piston 32. The valve rod 33 extends in a columnar shape in the first direction Da around the first center axis C1. Thus, the valve rod 33 can advance and retract in the first direction Da integrally with the valve main body 22 and the piston 32. Specifically, an end portion of the valve rod 33 on the first side Da1 in the first direction Da is immovably connected to the valve main body 22. As illustrated in FIG. 4, an end portion of the valve rod 33 on the second side Da2 in the first direction Da is immovably connected to the piston 32 in a state of being inserted into the first tubular portion 323. As illustrated in FIG. 2, the valve rod 33 penetrates through the second wall portion 17, the third wall portion 18, and the first casing portion 10A at respective intermediate portions in the first direction Da.

As illustrated in FIG. 4, the rotary sleeve 34 is disposed on the outer side Dro in the radial direction Dr with respect to the valve rod 33. The rotary sleeve 34 is formed in a tubular shape covering the valve rod 33. The rotary sleeve 34 is supported by the second casing portion 10B rotatably in the first circumferential direction Dc1 around the first center axis C1. The rotary sleeve 34 of the present embodiment integrally includes a second tubular portion 341 and the driven gear 342.

The radial direction Dr of the present embodiment is a radial direction of the valve device 2 around the first center axis C1. That is, the radial direction Dr is a direction orthogonal to the first center axis C1. An inner side Dri in the radial direction Dr is a side closer to the first center axis C1 in the radial direction Dr. The outer side Dro in the radial direction Dr is a side away from the first center axis C1 in the radial direction Dr. The first circumferential direction Dc1 is a circumferential direction of the valve device 2 with reference to the first center axis C1 (the valve rod 33).

The second tubular portion 341 is formed in a cylindrical shape around the first center axis C1. The second tubular portion 341 is disposed in the through-hole 17h. The second tubular portion 341 is supported via the pair of the bearings 343 rotatably in the first circumferential direction Dc1 around the first center axis C1 with respect to the second wall portion 17. The second tubular portion 341 is supported immovably in the first direction Da with respect to the second wall portion 17. The second tubular portion 341 includes a female thread portion 341m on an inside surface facing the inner side Dri in the radial direction Dr.

The driven gear 342 is fixed to an end portion of the second tubular portion 341 on the first side Da1 in the first direction Da. The driven gear 342 is formed integrally with the second tubular portion 341. The driven gear 342 is disposed on the first side Da1 in the first direction Da with respect to the second wall portion 17. That is, the driven gear 342 is disposed in the gear chamber 14b. The driven gear 342 is a bevel gear having a conical shape like an umbrella. The driven gear 342 includes a plurality of gear teeth 342g at intervals in the first circumferential direction Dc1.

The advancing and retracting sleeve 35 is disposed on an inner side of the rotary sleeve 34 in the radial direction Dr. The advancing and retracting sleeve 35 is formed in a tubular shape around the first center axis C1 while covering the valve rod 33 from the outer side Dro in the radial direction Dr. That is, the advancing and retracting sleeve 35 is disposed between the outside surface of the valve rod 33 and the inside surface of the rotary sleeve 34 when viewed from the first direction Da. The advancing and retracting sleeve 35 is fixed immovably with respect to the valve rod 33 and the piston 32. The advancing and retracting sleeve 35 is movable in the first direction Da with respect to the rotary sleeve 34. Thus, when the rotary sleeve 34 rotates in the first circumferential direction Dc1 with respect to the second casing portion 10B, the advancing and retracting sleeve 35 moves in the first direction Da. The advancing and retracting sleeve 35 of the present embodiment integrally includes a third tubular portion 351 and an enlarged-diameter portion 352.

The third tubular portion 351 is formed in a cylindrical shape around the first center axis C1. The third tubular portion 351 is formed to be longer than the rotary sleeve 34 in the first direction Da. The third tubular portion 351 protrudes on both sides of the first side Da1 and the second side Da2 in the first direction Da with respect to the rotary sleeve 34. That is, in the first direction Da, only a part of the third tubular portion 351 near the center thereof is disposed at a position overlapping with the rotary sleeve 34. The third tubular portion 351 is fixed to the valve rod 33 and the piston 32 in an immovable state. The third tubular portion 351 includes a tip surface 35s facing the first side Da1 in the first direction Da. The tip surface 35s is a plane located farthest to the first side Da1 in the first direction Da in the advancing and retracting sleeve 35.

The enlarged-diameter portion 352 is formed at a position close to the piston 32 in the first direction Da with respect to the rotary sleeve 34. The enlarged-diameter portion 352 is disposed in the first piston chamber 141. The enlarged-diameter portion 352 protrudes from the outside surface of the third tubular portion 351 toward the outer side Dro in the radial direction Dr. That is, the enlarged-diameter portion 352 protrudes to the outer side Dro in the radial direction Dr from the inside surface of the second tubular portion 341 disposed outside the third tubular portion 351. The enlarged-diameter portion 352 is formed in an annular shape extending around the first circumferential direction Dc1 when viewed from the first direction Da.

The third tubular portion 351 includes a male thread portion 351m on the first side Da1 in the first direction Da with respect to the enlarged-diameter portion 352. The male thread portion 351m is formed on the outside surface of the third tubular portion 351 facing the outer side Dro in the radial direction Dr. The male thread portion 351m meshes with the female thread portion 341m of the second tubular portion 341.

As illustrated in FIG. 3, the coil spring 36 is disposed between the piston 32 and the second wall portion 17. That is, the coil spring 36 is disposed in the first piston chamber 141. The coil spring 36 is disposed in a compressed state to bias the piston main body 321 toward the second side Da2 in the first direction Da with respect to the second wall portion 17.

The manual operation unit 40 can advance and retract the valve rod 33 in the first direction Da when an operator or the like performs a manual operation from the outside of the valve device 2. The manual operation unit 40 of the present embodiment includes the operation shaft 41, a support tube 42, the operation member 43, the drive gear 44, and an operation unit bearing 45.

The operation shaft 41 is disposed between the second wall portion 17 and the third wall portion 18 in the first direction Da. The operation shaft 41 is disposed on the outer side Dro of the rotary sleeve 34 in the radial direction Dr. The operation shaft 41 extends in the second direction Db around the second center axis C2. The operation shaft 41 extends protruding from the interior of the tubular wall portion 15 toward the outer side Dro in the radial direction Dr.

The support tube 42 is formed in a tubular shape around the second center axis C2. The support tube 42 is formed to be shorter than the operation shaft 41 in the second direction Db. The support tube 42 covers the operation shaft 41. Thus, the base end portion of the operation shaft 41 on the first side Db1 in the second direction Db protrudes to the outer side Dro of the support tube 42 in the radial direction Dr. The tip portion of the operation shaft 41 on the second side Db2 in the second direction Db protrudes to the inner side Dri of the support tube 42 in the radial direction Dr. The support tube 42 is fixed to the tubular wall portion 15 in a state of penetrating the tubular wall portion 15 in the radial direction Dr. A pair of operation unit bearings 45 disposed at an interval in the second direction Db is fixed to the inside surface of the support tube 42.

The pair of operation unit bearings 45 supports the operation shaft 41 rotatably in a second circumferential direction Dc2 around the second center axis C2 with respect to the support tube 42. Accordingly, the operation shaft 41 is supported in a state of being inserted into the support tube 42. The operation shaft 41 can be rotated in the second circumferential direction Dc2 around the second center axis C2 with respect to the support tube 42 by the pair of operation unit bearings 45 disposed at an interval in the second direction Db.

The operation member 43 is fixed to the base end portion of the operation shaft 41 in the second direction Db outside the second casing portion 10B. The operation member 43 rotates the operation shaft 41 in the second circumferential direction Dc2 around the second center axis C2. The operation member 43 of the present embodiment is a so-called handle. That is, the operation member 43 has a shape that is easy for an operator to grip and has a much larger diameter than the operation shaft 41.

As illustrated in FIG. 4, the drive gear 44 is fixed to the tip portion of the operation shaft 41 in the second direction Db inside the second casing portion 10B. The drive gear 44 is formed integrally with the operation shaft 41. The drive gear 44 is disposed on the first side Da1 of the second wall portion 17 in the first direction Da. That is, the drive gear 44 is disposed in the gear chamber 14b. The drive gear 44 is a bevel gear having an umbrella shape. The drive gear 44 includes a plurality of gear teeth 44g at intervals in the second circumferential direction Dc2. The gear teeth 44g of the drive gear 44 mesh with the gear teeth 342g of the driven gear 342. Accordingly, the operation shaft 41 and the second tubular portion 341 are connected to each other in a state where the rotation of the operation shaft 41 in the second circumferential direction Dc2 can be converted into the rotation in the first circumferential direction Dc1 and transmitted to the rotary sleeve 34 by the drive gear 44 and the driven gear 342.

In the manual operation unit 40 described above, when an operator manually rotates the operation member 43 in the second circumferential direction Dc2, the operation shaft 41 and the drive gear 44 rotate integrally with the operation member 43 in the second circumferential direction Dc2. The rotation of the drive gear 44 around the second circumferential direction Dc2 is transmitted to the driven gear 342. As a result, the driven gear 342 rotates together with the second tubular portion 341 in the first circumferential direction Dc1. That is, the rotary sleeve 34 is rotationally driven in the first circumferential direction Dc1 by the manual operation unit 40. In this way, the drive gear 44 and the driven gear 342 constitute a rotation transmission mechanism 40D of the valve device 2. The rotation transmission mechanism 40D is a mechanism that connects the operation shaft 41 and the rotary sleeve 34 such that the rotation of the operation shaft 41 in the second circumferential direction Dc2 is converted into the rotation in the first circumferential direction Dc1 and transmitted to the rotary sleeve 34.

When the rotary sleeve 34 rotates in the first circumferential direction Dc1, the advancing and retracting sleeve 35 including the male thread portion 351m meshing with the female thread portion 341m of the rotary sleeve 34 moves in the first direction Da with respect to the rotary sleeve 34. As a result, the valve rod 33, the piston 32, and the valve main body 22 move in the first direction Da together with the advancing and retracting sleeve 35. Since the advancing and retracting sleeve 35 and the valve rod 33 are fixed to each other, the advancing and retracting sleeve 35 linearly moves in the first direction Da without rotating in the first circumferential direction Dc1 together with the rotary sleeve 34.

The stopper member 50 restricts the amount of movement of the advancing and retracting sleeve 35 toward the first side Da1 in the first direction Da to a predetermined specified value. The stopper member 50 can come into contact with the advancing and retracting sleeve 35 when the advancing and retracting sleeve 35 moves toward the first side Da1 in the first direction Da by the specified value. The stopper member 50 is fixed to the valve casing 10 at a position close to the valve main body 22 in the first direction Da with respect to the advancing and retracting sleeve 35. The stopper member 50 is formed protruding from the inside surface of the valve casing 10 toward the second side Da2 in the first direction Da. The stopper member 50 of the present embodiment is formed as one component integrally with the guide sleeve 51 fixed to the third wall portion 18. The stopper member 50 is formed extending from the flange portion 512 toward the second side Da2 in the first direction Da. Thus, the stopper member 50 is disposed in a state of protruding from a surface 18f of the third wall portion 18 toward the second side Da2 in the first direction Da. The stopper member 50 is formed in an annular shape around the first center axis C1 while covering the valve rod 33 from the outer side Dro in the radial direction Dr. The stopper member 50 of the present embodiment includes a restricting surface 501, a communication portion 502 (see FIG. 5), and a recessed portion 503.

The restricting surface 501 is formed at an end portion of the stopper member 50 on the second side Da2 in the first direction Da. The restricting surface 501 faces the piston 32 in the first direction Da. That is, the restricting surface 501 faces the second side Da2 in the first direction Da. The restricting surface 501 is formed as a plane orthogonal to the first direction Da. The restricting surface 501 can come into contact with only a tip surface 35s when the advancing and retracting sleeve 35 moves toward the first side Da1 in the first direction Da by the specified value.

Figure 5:
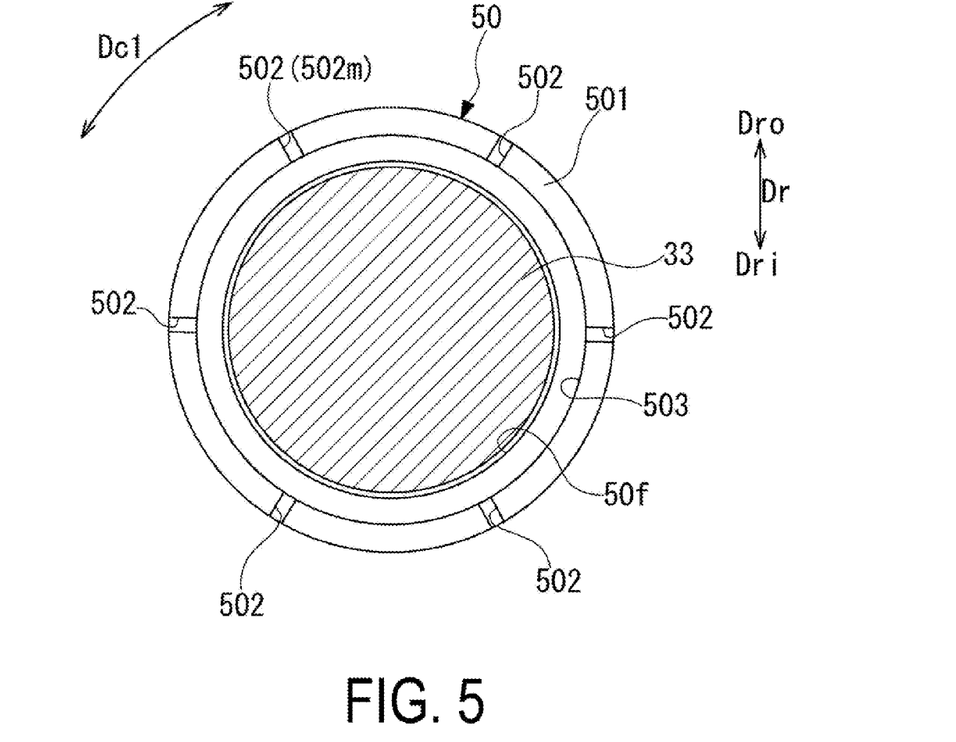
FIG. 5 is a diagram of the stopper member into which the valve rod is inserted as viewed from a second side in a first direction.

As illustrated in FIG. 5, the communication portion 502 communicates between the inside and the outside in the radial direction Dr with the restricting surface 501 in contact with the advancing and retracting sleeve 35. That is, the communication portion 502 causes with the restricting surface 501 in contact with the tip surface 35s in the first direction Da, the inside of the stopper member 50, that is, a minute clearance between the inside surface of the stopper member 50 and the valve rod 33 to communicate with the outside of the stopper member 50, that is, the gear chamber 14b. The communication portion 502 of the present embodiment includes a groove 502m that is recessed in the first direction Da from the restricting surface 501 toward the first side Da1 and extends in the radial direction Dr. A plurality of communication portions 502 (grooves 502m) are formed at intervals in the first circumferential direction Dc1.

In the stopper member 50, the recessed portion 503 is formed recessed in the first direction Da from the restricting surface 501 and recessed toward the outer side Dro in the radial direction Dr from an inside surface 50f facing the inner side Dri in the radial direction Dr.

In the stopper member 50, the specified value of the amount of movement of the advancing and retracting sleeve 35 is set such that the valve main body 22 does not further move toward the first side Da1 in the first direction Da in the fully-opened state of the valve device 2, that is, a state in which the valve main body 22 is most separated from the valve seat portion 23 toward the first side Da1 in the first direction Da. That is, a state in which the stopper member 50 is in contact with the advancing and retracting sleeve 35 is the fully-opened state.

As illustrated in FIG. 4, the stopper member 50 of the present embodiment restricts the amount of movement of the advancing and retracting sleeve 35 so as to form a gap S between the advancing and retracting sleeve 35 and the rotary sleeve 34 in the first direction Da with the stopper member 50 and the advancing and retracting sleeve 35 in contact with each other. More specifically, the stopper member 50 restricts the amount of movement of the advancing and retracting sleeve 35 so as to form the gap S between the enlarged-diameter portion 352 and the second tubular portion 341 in the first direction Da with the restricting surface 501 and the tip surface 35s in contact with each other.

Next, the operation of the above-described valve device 2 will be described. As illustrated in FIG. 2, during normal operation of the valve device 2, the piston 32 is disposed at a position on the first side Da1 in the first direction Da, which is closer to the second wall portion 17, against a biasing force of the coil spring 36 by the pressure (oil pressure) of the oil filled in the second piston chamber 142.

As a result, the valve rod 33 connected to the piston 32 also moves toward the first side Da1 in the first direction Da. Accordingly, the valve main body 22 connected to the valve rod 33 is disposed at a position on the first side Da1 in the first direction Da while being separated from the outlet-side opening 11b in the valve chamber 11. Thus, the valve main body 22 is most separated from the valve seat portion 23 toward the first side Da1 in the first direction Da. In this fully-opened state, the inlet-side opening 11a and the outlet-side opening 11b communicate with each other, and steam flows from the inlet flow path portion 12 to the outlet flow path portion 13 passing around the valve portion 20.

Figure 6:
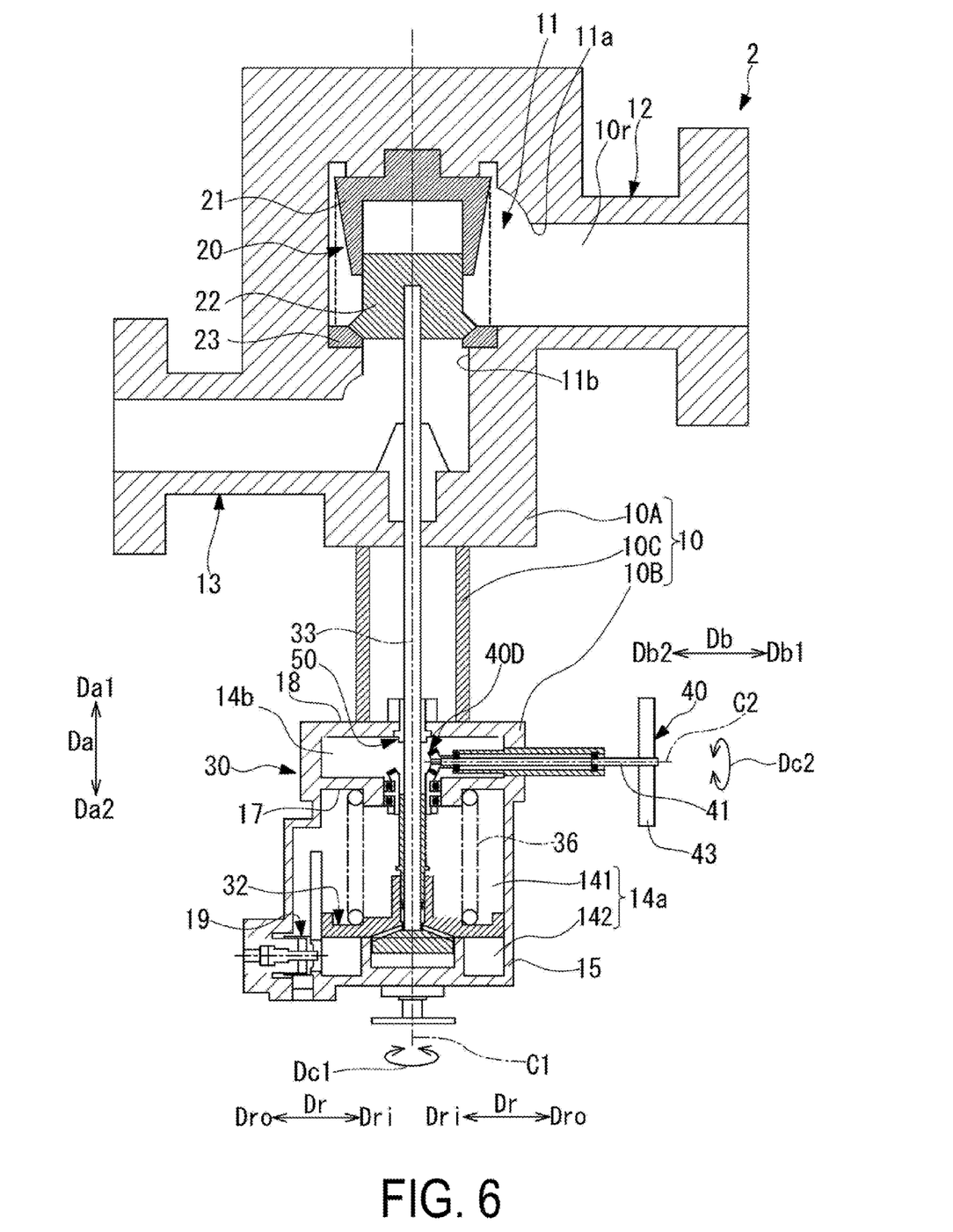
FIG. 6 is a cross-sectional view illustrating a state in which a valve main body is closed in the valve device.

At emergency stop, the oil inside the piston chamber 14a is drained to the drain flow path 19b by the emergency trip cylinder 19a. As a result, the piston 32 is pushed by the biasing force of the coil spring 36 to move toward the second side Da2 in the first direction Da close to the first wall portion 16. Accordingly, as illustrated in FIG. 6, the valve rod 33 connected to the piston 32 also moves toward the second side Da2 in the first direction Da. Thus, the valve main body 22 connected to the valve rod 33 is disposed at a position on the second side Da2 in the first direction Da so as to be closer the outlet-side opening 11b in the valve chamber 11. As a result, the valve main body 22 comes into contact with the valve seat portion 23, and the outlet-side opening 11b is fully closed. In this fully-closed state, the inlet-side opening 11a and the outlet-side opening 11b do not communicate with each other, and steam cannot flow from the inlet flow path portion 12 to the outlet flow path portion 13 passing around the valve portion 20.

Thus, in the valve device 2, the piston 32 advances and retracts in the first direction Da due to changes in oil pressure (changes in oil amount) in the second casing portion 10B, and whereby the valve rod 33 and the valve main body 22 connected to the piston 32 advances and retracts in the first direction Da together with the piston 32. Accordingly, the valve main body 22 advances and retracts in the first direction Da in the first casing portion 10A, and the flow path 10r through which a fluid flows is opened and closed.

As illustrated in FIG. 2, when an operator operates the operation member 43 outside the valve casing 10, the operation shaft 41 extending in the second direction Db rotates in the second circumferential direction Dc2. The rotation of the operation shaft 41 in the second circumferential direction Dc2 is transmitted to the rotary sleeve 34 orthogonal to the operation shaft 41 by the drive gear 44 and the driven gear 342 constituting the rotation transmission mechanism 40D. Accordingly, the rotary sleeve 34 covering the advancing and retracting sleeve 35 rotates in the first circumferential direction Dc1. When the rotary sleeve 34 rotates in the first circumferential direction Dc1, the advancing and retracting sleeve 35 including the male thread portion 351m meshing with the female thread portion 341m of the rotary sleeve 34 moves in the first direction Da. At this time, the advancing and retracting sleeve 35 is fixed immovably in the first circumferential direction Dc1 and the first direction Da with respect to the valve rod 33. Thus, the advancing and retracting sleeve 35 moves in the first direction Da with respect to the second casing portion 10B without moving in the first circumferential direction Dc1 and the first direction Da with respect to the valve rod 33. Further, the advancing and retracting sleeve 35 is also fixed immovably with respect to the piston 32. Thus, the piston 32 also moves in the first direction Da together with the advancing and retracting sleeve 35. As a result, the valve rod 33 and the valve main body 22 advance and retract in the first direction Da together with the piston 32, and the flow path 10r formed inside the first casing portion 10A is opened and closed. In this way, the valve main body 22 can be manually opened and closed by operating the operation member 43 disposed outside the valve casing 10.

Further, when the advancing and retracting sleeve 35 moves toward the first side Da1 in the first direction Da by the specified value, the advancing and retracting sleeve 35 touches the stopper member 50 fixed to the second casing portion 10B. Accordingly, the movement of not only the advancing and retracting sleeve 35 but also the piston 32, the valve rod 33, and the valve main body 22 toward the first side Da1 in the first direction Da is restricted to the specified value.

Operational Effects

In the valve device 2 having the configuration described above, when the advancing and retracting sleeve 35 moves toward the first side Da1 in the first direction Da by the specified value, the advancing and retracting sleeve 35 touches the stopper member 50 fixed to the second casing portion 10B. Thus, the direct contact of the advancing and retracting sleeve 35 with the second casing portion 10B can be suppressed. In addition, since the advancing and retracting sleeve 35 that has moved toward the first side Da1 in the first direction Da by a specified amount is in contact with the stopper member 50, the advancing and retracting sleeve 35 cannot further move to the first side Da1 in the first direction Da from that position. Accordingly, even when the advancing and retracting sleeve 35 is pushed toward the first side Da1 in the first direction Da by the oil pressure in the piston chamber 14a, the advancing and retracting sleeve 35 does not move toward the first side Da1 in the first direction Da. Thus, the advancing and retracting sleeve 35 is suppressed from moving to bite into the stopper member 50. Therefore, strong contact of the advancing and retracting sleeve 35 with the stopper member 50 is suppressed. As a result, even when the advancing and retracting sleeve 35 is in contact with the stopper member 50 for a long time, adherence of the advancing and retracting sleeve 35 to the stopper member 50 is suppressed, and the degree of opening can be stably changed from the degree of opening maintained for a long time.

When the advancing and retracting sleeve 35 moves toward the first side Da1 in the first direction Da by the specified value, the tip surface 35s of the advancing and retracting sleeve 35 touches the restricting surface 501 of the stopper member 50 in a surface contact manner. Thus, a certain size of contact area can be provided between the advancing and retracting sleeve 35 and the stopper member 50. Accordingly, the advancing and retracting sleeve 35 and the stopper member 50 can be suppressed from being subjected to a strong force that may be applied thereto unlike the case where the contact area between the advancing and retracting sleeve 35 and the stopper member 50 is too small. This can more effectively reduce adherence of the advancing and retracting sleeve 35.

In addition, the inside and the outside of the stopper member 50 communicate with each other in the radial direction Dr via the communication portion 502 with the advancing and retracting sleeve 35 in contact with the restricting surface 501 of the stopper member 50. The oil for driving the piston 32 may reach the interior of the stopper member 50 through between the valve rod 33 and the advancing and retracting sleeve 35. In such a case, the oil enters between the valve rod 33 and the stopper member 50. Then, if the advancing and retracting sleeve 35 is in contact with the stopper member 50 for a long time, degraded oil may remain between the valve rod 33 and the stopper member 50. As a result, the degraded oil also remains between the tip surface 35s and the restricting surface 501, causing an environment in which the adherence is likely to occur. However, the communication portion 502 formed causes the inside and the outside of the stopper member 50 to communicate with each other. Thus, even when the tip surface 35s is in contact with the restricting surface 501, the oil remaining inside the stopper member 50 can be drained to the outside through the communication portion 502. This can more effectively reduce adherence of the advancing and retracting sleeve 35.

Further, the communication portion 502 includes the groove 502m. This can easily form a structure for draining oil to the outside in the stopper member 50. The oil that has reached the interior of the stopper member 50 through between the valve rod 33 and the advancing and retracting sleeve 35 can be smoothly drained to the outside of the stopper member 50 through the groove 502m extending in the radial direction Dr.

The stopper member 50 includes the recessed portion 503 recessed from the restricting surface 501 and from the inside surface 50f. This can store the oil that reaches the interior of the stopper member 50 through between the valve rod 33 and the advancing and retracting sleeve 35 in the recessed portion 503. Accordingly, the oil remaining in the interior of the stopper member 50 can be suppressed from deeply entering the first side Da1 in the first direction Da between the valve rod 33 and the stopper member 50. In addition, since the recessed portion 503 is connected to the groove 502m, the oil stored in the recessed portion 503 can be quickly drained to the outside of the stopper member 50.

Further, with the advancing and retracting sleeve 35 in contact with the stopper member 50, the gap S is formed between the enlarged-diameter portion 352 formed at the advancing and retracting sleeve 35 and the rotary sleeve 34. This causes the rotary sleeve 34 and the enlarged-diameter portion 352 of the advancing and retracting sleeve 35 immovable in the first circumferential direction Dc1 to be always separated in the first direction Da. Thus, the rotary sleeve 34 that rotates in the first circumferential direction Dc1 and the advancing and retracting sleeve 35 immovable in the first circumferential direction Dc1 do not come into contact with each other in the first direction Da. This can also reduce adherence between the rotary sleeve 34 and the advancing and retracting sleeve 35. Also in this respect, the degree of opening can be stably changed from the degree of opening maintained for a long time.

Other Embodiments

An embodiment according to the disclosure has been described in detail with reference to the drawings. However, the specific configuration of the disclosure is not limited to this embodiment. Design change without departing from the main gist of the disclosure or the like is also included.

In the above-described embodiment, the groove 502m is formed as the communication portion 502, but the configuration of the communication portion 502 is not limited to such a structure. The communication portion 502 may include, for example, a hole penetrating the stopper member 50 in the radial direction Dr.

In the above-described embodiment, the stopper member 50 is formed integrally with the guide sleeve 51, but is not limited to such a structure. The stopper member 50 may be formed as an independent component separate from the guide sleeve 51. In that case, the stopper member 50 may be fixed to the guide sleeve 51 or may be fixed to the third wall portion 18.

In the above-described embodiment, the valve device 2 drives the valve rod 33 and the piston 32 so as to become closed when the valve rod 33 and the piston 32 are moved to the second side Da2 in the first direction Da, but the structure of the valve device 2 is not limited to such a structure. For example, the valve device 2 may be configured to become closed when the valve rod 33 and the piston 32 move to the first side Da1 in the first direction Da.

Further, in the valve device 2 of the present embodiment, a state where the stopper member 50 is in contact with the advancing and retracting sleeve 35 is the fully-opened state, but the specified value of the amount of movement of the advancing and retracting sleeve 35 in the stopper member 50 is not limited to being set in this way. For example, the specified value of the amount of movement of the advancing and retracting sleeve 35 may be set such that a state where the stopper member 50 is in contact with the advancing and retracting sleeve 35 is the fully-closed state. Alternatively, the specified value of the amount of movement of the advancing and retracting sleeve 35 may be set such that a state where the stopper member 50 is in contact with the advancing and retracting sleeve 35 is any degree of opening between the fully-opened state and the fully-closed state.

The valve device 2 is not limited to a trip and throttle valve as in the present embodiment. The valve device 2 may be, for example, a flow control valve that is required to maintain a constant degree of opening for a long time.

Notes

The valve device 2 according to an embodiment is understood as follows, for example.

(1) A valve device 2 according to a first aspect includes: a valve casing internally including a flow path 10r through which a fluid flows; a valve main body 22 capable of advancing and retracting in a first direction Da in the valve casing 10 and capable of opening and closing the flow path 10r; a piston 32 disposed in the valve casing 10 and driven by oil pressure to advance and retract in the first direction Da; a valve rod 33 extending in the first direction Da around a first center axis C1, connecting the valve main body 22 and the piston 32, and capable of advancing and retracting in the first direction Da integrally with the valve main body 22 and the piston 32; a rotary sleeve 34 disposed on an outer side Dro of the valve rod 33 in a radial direction Dr around the first center axis C1, formed in a tubular shape covering the valve rod 33, and rotatably supported on the valve casing 10 in a first circumferential direction Dc1 around the first center axis C1; an operation shaft 41 disposed on the outer side Dro of the rotary sleeve 34 in the radial direction Dr and extending in a second direction Db intersecting the first direction Da around a second center axis C2; an operation member 43 fixed to a base end portion of the operation shaft 41 in the second direction Db outside the valve casing 10 and configured to rotate the operation shaft 41 in a second circumferential direction Dc2 around the second center axis C2; an advancing and retracting sleeve 35 formed in a tubular shape around the first center axis C1 while covering the valve rod 33 from the outer side Dro in the radial direction Dr on an inner side Dri of the rotary sleeve 34 in the radial direction Dr and immovably fixed to the valve rod 33 and the piston 32; and a stopper member 50 fixed to the valve casing 10 at a position close to the valve main body 22 in the first direction Da with respect to the advancing and retracting sleeve 35 and configured to restrict an amount of movement of the advancing and retracting sleeve 35 toward a first side Da1 in the first direction Da to a specified value predetermined. The operation shaft 41 is connected to the rotary sleeve 34 such that a rotation of the operation shaft 41 in the second circumferential direction Dc2 can be converted into a rotation in the first circumferential direction Dc1 and transmitted to the rotary sleeve 34. The advancing and retracting sleeve 35 is movable in the first direction Da when the rotary sleeve 34 rotates in the first circumferential direction Dc1. The stopper member 50 is capable of coming into contact with the advancing and retracting sleeve 35 when the advancing and retracting sleeve 35 moves toward the first side Da1 in the first direction Da by the specified value.

This causes the advancing and retracting sleeve 35 to touch the stopper member 50 fixed to the valve casing 10 when the advancing and retracting sleeve 35 moves toward the first side Da1 in the first direction Da by the specified value. Thus, the direct contact of the advancing and retracting sleeve with the valve casing 10 can be suppressed. In addition, since the advancing and retracting sleeve 35 that has moved toward the first side Da1 in the first direction Da by the specified amount is in contact with the stopper member 50, the advancing and retracting sleeve 35 cannot further move to the first side Da1 in the first direction Da from that position. Accordingly, even when the advancing and retracting sleeve 35 is pushed toward the first side Da1 in the first direction Da by the oil pressure in the valve casing 10, the advancing and retracting sleeve 35 does not move toward the first side Da1 in the first direction Da. Thus, the advancing and retracting sleeve 35 is suppressed from moving to bite into the stopper member 50. Therefore, strong contact of the advancing and retracting sleeve 35 with the stopper member 50 is suppressed. As a result, even when the advancing and retracting sleeve 35 is in contact with the stopper member 50 for a long time, adherence of the advancing and retracting sleeve 35 to the stopper member 50 is suppressed, and the degree of opening can be stably changed from the degree of opening maintained for a long time.

(2) The valve device 2 according to a second aspect is the valve device 2 of (1). The stopper member 50 is formed in an annular shape around the first center axis C1 while covering the valve rod 33 from the outer side Dro in the radial direction Dr and has a restricting surface 501 facing the piston 32 in the first direction Da and capable of coming into contact with the advancing and retracting sleeve 35.

This causes the advancing and retracting sleeve 35 to touch the restricting surface 501 of the stopper member 50 in a surface contact manner when the advancing and retracting sleeve 35 moves toward the first side Da1 in the first direction Da by the specified value. Thus, a certain size of contact area can be provided between the advancing and retracting sleeve 35 and the stopper member 50. Accordingly, the advancing and retracting sleeve 35 and the stopper member 50 can be suppressed from being subjected to a strong force that may be applied thereto unlike the case where the contact area between the advancing and retracting sleeve 35 and the stopper member 50 is too small. This can more effectively reduce adherence of the advancing and retracting sleeve 35.

(3) The valve device 2 according to a third aspect is the valve device 2 of (2). The stopper member 50 further includes a communication portion 502 causing an inside to communicate with an outside in the radial direction Dr with the restricting surface 501 in contact with the advancing and retracting sleeve 35.

The oil for driving the piston 32 may reach the interior of the stopper member 50 through between the valve rod 33 and the advancing and retracting sleeve 35. In such a case, the oil enters between the valve rod 33 and the stopper member 50. Then, if the advancing and retracting sleeve 35 is in contact with the stopper member 50 for a long time, degraded oil may remain between the valve rod 33 and the stopper member 50. As a result, the degraded oil also remains between the advancing and retracting sleeve 35 and the restricting surface 501, causing an environment in which the adherence is likely to occur. However, the communication portion 502 formed causes the inside and the outside of the stopper member 50 to communicate with each other. Thus, even when the advancing and retracting sleeve 35 is in contact with the restricting surface 501, the oil remaining inside the stopper member 50 can be drained to the outside through the communication portion 502. This can more effectively reduce adherence of the advancing and retracting sleeve 35.

(4) The valve device 2 according to a fourth aspect is the valve device 2 of (3). The communication portion 502 includes a groove 502m recessed in the first direction Da from the restricting surface 501 and extending in the radial direction Dr.

This can easily form a structure for draining oil to the outside in the stopper member 50. The oil that has reached the interior of the stopper member 50 through between the valve rod 33 and the advancing and retracting sleeve 35 can be smoothly drained to the outside of the stopper member 50 through the groove 502m extending in the radial direction Dr.

(5) The valve device 2 according to a fifth aspect is the valve device 2 of any one of (2) to (4). The stopper member 50 includes a recessed portion 503 formed recessed in the first direction Da from the restricting surface 501 and recessed toward the outer side Dro in the radial direction Dr from an inside surface facing the inner side Dri in the radial direction Dr.

This can store the oil that reaches the interior of the stopper member 50 through between the valve rod 33 and the advancing and retracting sleeve 35 in the recessed portion 503. Accordingly, the oil remaining in the interior of the stopper member 50 can be suppressed from deeply entering the first side Da1 in the first direction Da between the valve rod 33 and the stopper member 50.

(6) The valve device 2 according to a sixth aspect is the valve device 2 of any one of (1) to (5). The advancing and retracting sleeve 35 includes an enlarged-diameter portion 352 protruding to the outer side Dro in the radial direction Dr from the inside surface of the rotary sleeve 34 at a position close to the piston 32 in the first direction Da with respect to the rotary sleeve 34. The enlarged-diameter portion 352 forms a gap S with the rotary sleeve 34 in the first direction Da with the advancing and retracting sleeve 35 in contact with the stopper member 50.

This causes the rotary sleeve 34 and the advancing and retracting sleeve immovable in the first circumferential direction Dc1 to be always separated in the first direction Da. Thus, the rotary sleeve 34 that rotates in the first circumferential direction Dc1 and the advancing and retracting sleeve 35 immovable in the first circumferential direction Dc1 do not come into contact with each other in the first direction Da. This can also reduce adherence between the rotary sleeve 34 and the advancing and retracting sleeve 35. Also in this respect, the degree of opening can be stably changed from the degree of opening maintained for a long time.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A valve device, comprising:
a valve casing internally including a flow path through which a fluid flows;
a valve main body capable of advancing and retracting in a first direction in the valve casing and capable of opening and closing the flow path;
a piston disposed in the valve casing and driven by oil pressure to advance and retract in the first direction;
a valve rod extending in the first direction around a first center axis, connecting the valve main body and the piston, and capable of advancing and retracting in the first direction integrally with the valve main body and the piston;
a rotary sleeve disposed on an outer side of the valve rod in a radial direction around the first center axis, formed in a tubular shape covering the valve rod, and rotatably supported on the valve casing in a first circumferential direction around the first center axis;
an operation shaft disposed on an outer side of the rotary sleeve in the radial direction and extending in a second direction intersecting the first direction around a second center axis;
an operation member fixed to a base end portion of the operation shaft in the second direction outside the valve casing and configured to rotate the operation shaft in a second circumferential direction around the second center axis;
an advancing and retracting sleeve formed in a tubular shape around the first center axis while covering the valve rod from an outer side in the radial direction on an inner side of the rotary sleeve in the radial direction and immovably fixed to the valve rod and the piston; and
a stopper member fixed to the valve casing at a position close to the valve main body in the first direction with respect to the advancing and retracting sleeve and configured to restrict an amount of movement of the advancing and retracting sleeve toward a first side in the first direction to a specified value predetermined, wherein
the operation shaft is connected to the rotary sleeve such that a rotation of the operation shaft in the second circumferential direction can be converted into a rotation in the first circumferential direction and transmitted to the rotary sleeve,
the advancing and retracting sleeve is movable in the first direction when the rotary sleeve rotates in the first circumferential direction, and
the stopper member is capable of coining into contact with the advancing and retracting sleeve when the advancing and retracting sleeve moves toward the first side in the first direction by the specified value.

2. The valve device according to claim 1, wherein the stopper member is formed in an annular shape around the first center axis while covering the valve rod from an outer side in the radial direction and has a restricting surface facing the piston in the first direction and capable of coming into contact with the advancing and retracting sleeve.

3. The valve device according to claim 2, wherein the stopper member further includes a communication portion causing an inside to communicate with an outside in the radial direction with the restricting surface in contact with the advancing and retracting sleeve.

4. The valve device according to claim 3, wherein the communication portion includes a groove recessed in the first direction from the restricting surface and extending in the radial direction.

5. The valve device according to claim 2, wherein the stopper member includes a recessed portion formed recessed in the first direction from the restricting surface and recessed toward an outer side in the radial direction from an inside surface facing an inner side in the radial direction.

6. The valve device according to claim 1, wherein
the advancing and retracting sleeve includes an enlarged-diameter portion protruding to an outer side in the radial direction from an inside surface of the rotary sleeve at a position close to the piston in the first direction with respect to the rotary sleeve, and
the enlarged-diameter portion forms a gap with the rotary sleeve in the first direction with the advancing and retracting sleeve in contact with the stopper member.

* * * * *